T. M. JARRELL.
NON-SKID AUTO CHAIN.
APPLICATION FILED OCT. 28, 1916.
1,226,890.
Patented May 22, 1917.
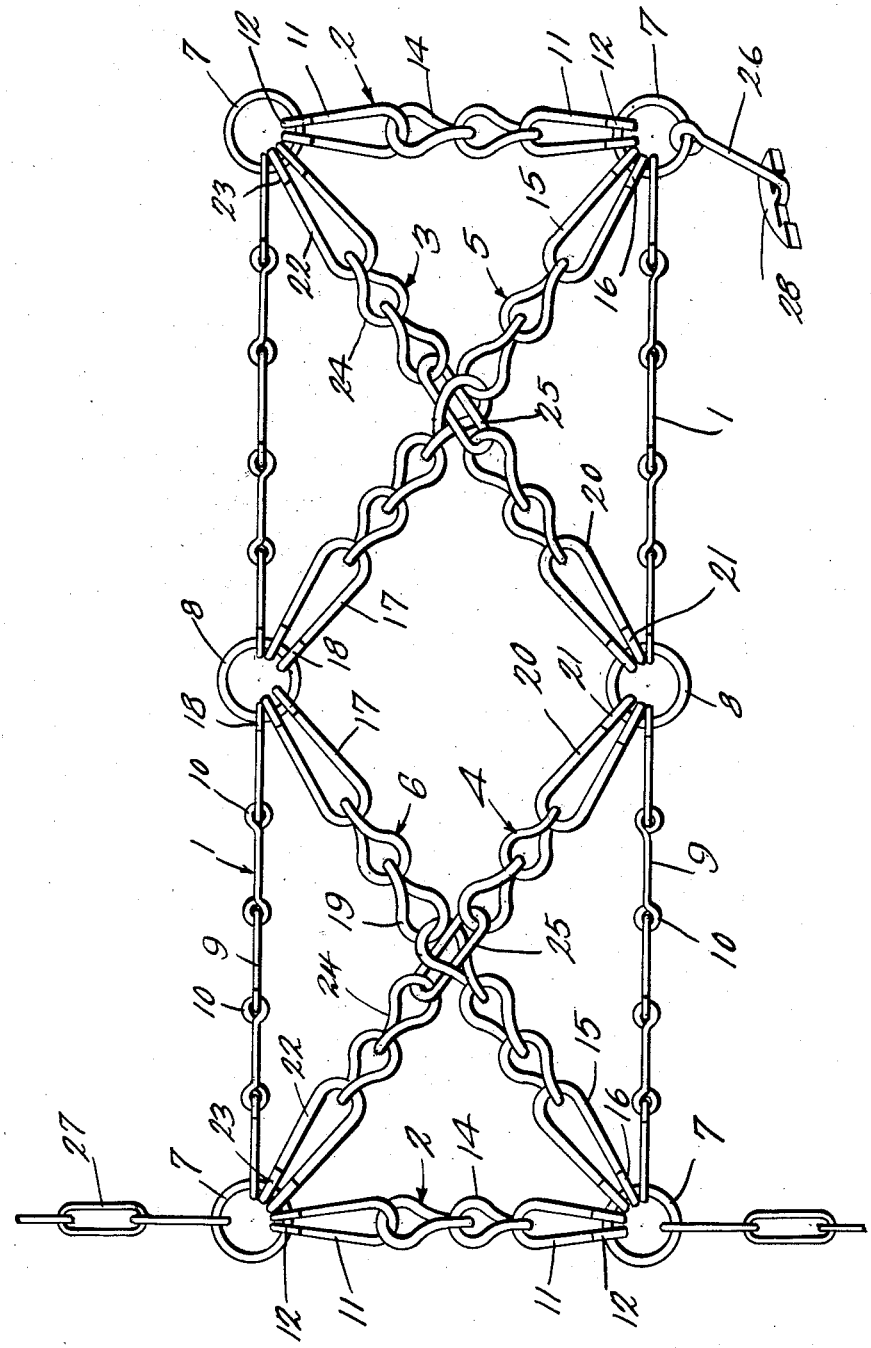
Witnesses
T. M. Jarrell, Inventor
by C. A. Snow & Co., Attorneys

UNITED STATES PATENT OFFICE.

THOMAS MARVIN JARRELL, OF HIGH POINT, NORTH CAROLINA, ASSIGNOR OF ONE-HALF TO WILLIAM D. SIMMONS, OF HIGH POINT, NORTH CAROLINA.

NON-SKID AUTO-CHAIN.

1,226,890.  Specification of Letters Patent.  Patented May 22, 1917.

Application filed October 28, 1916. Serial No. 128,245.

*To all whom it may concern:*

Be it known that I, THOMAS M. JARRELL, a citizen of the United States, residing at High Point, in the county of Guilford and State of North Carolina, have invented a new and useful Non-Skid Auto-Chain, of which the following is a specification.

The device forming the subject matter of this application is a non-skid chain, adapted to be applied to the wheels of automobiles, bicycles, motorcycles, and other structures of a similar kind.

The invention aims to provide novel means for assembling the constituent chains of the device so that the structure will fit down smoothly on the wheel and present an antiskidding surface of peculiar efficiency.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings, the invention is disclosed in a single plan.

The structure forming the subject matter of this application is made up of side chains 1, tie chains 2 disposed at right angles to the side chains 1 and terminally connected therewith, cross chains 3 and 4, disposed at an obtuse angle to each other, the cross chains 3 and 4 each being connected at its outer end to one of the side chains 1 at the ends of the said chain, and being connected at its other end, to the other side chain 1, intermediate the ends of the said chain. The invention further includes cross chains 5 and 6 disposed at an obtuse angle to each other and interengaged with the cross chains 3 and 4. The cross chains 5 and 6, each, at one end, is connected to one side chain 1 intermediate the ends of the said side chain, the other end of each cross chain being connected to one end of the other side chain 1, all of which will be obvious from single figure of the drawing.

The side chains 1 include terminal rings 7 and an intermediate ring 8, the side chains 1 including bar links 9 having eyes 10, the eyes 10 of the respective bar links 9 being interengaged with each other, and the terminal eyes 10 of the outermost bar links being engaged with the terminal rings 7 and with the intermediate rings 8.

The tie chains 2 comprise U-shaped links 11 having eyes 12 engaged with the terminal rings 7 of the side chains 1. The U-shaped links 11 of the side chains 2 are connected by twisted links 14.

The cross chains 5 and 6 include U-shaped links 15 having eyes 16 engaged with the terminal rings 7 of one of the chains 1. The cross chains 5 and 6 further include U-shaped links 17 having eyes 18 engaged with one of the intermediate rings 8. The links 15 and 17 are connected by twisted links 19.

The chains 3 and 4 comprise U-shaped links 20 having eyes 21 engaged with one of the intermediate rings 8, the chains 3 and 4 including U-shaped links 22 having eyes 23 engaged with the terminal rings 7 of one of the side chains 1. The U-shaped links 20 and 22 are connected by a series of twisted links 24, in which series is interposed a flat loop-shaped link 25, the links 25 passing through one of the twisted links 19 of the chains 5 and 6. Especial attention is directed to these flat links 25, since they permit the chains 5 and 3, and 6 and 4 to be interengaged at their point of crossing in such a way that the chains will lie down close to the tire with which the device is assembled.

The terminal rings 7 of the side chains 1 are connected by the tie chains 2, but, it is to be observed, the intermediate rings 8 are not connected by tie chains. Consequently, when a circumferential pull is exerted on the side chains 1, the chains 3 and 5, and 6 and 4, can be drawn tightly down on the tire. When the side chains 1 are tightened up, the rings 8 tend to move in opposite directions transversely of the tire, to thus effect a thorough tightening of the guard, both circumferentially and transversely.

With the rings 7 may be assembled loop-shaped links 27, constituting chains, and at the ends of the said chains, or elsewhere, may be located latch members 26 having transverse heads 28, the function of these parts being clear, and it being understood that thereby, a means is provided whereby the protector is held on the wheel rim.

The eyes of the various links, of which the bar links 9 may be taken as typical, may be electrically welded.

It is of course understood that the drawings show one panel only of the protector, but the structure delineated in the drawings is duplicated any desired number of times, depending upon the circumference of the tire wherewith this device is assembled.

The device forming the subject matter of this application is so constructed that it affords a maximum amount of traction for the driving wheels of a vehicle. The device not only exercises a strong pull in the direction which the vehicle is traveling, but also acts laterally, either to the right or to the left of the direction of travel, and will hold the vehicle on a straight line of travel, even upon the most slippery road. In this regard, the device forming the subject matter of this application has manifest and prominent advantages over all other structures of a similar sort heretofore proposed. Owing to the specific construction of the side chains 1, these chains will be stronger than other chains having the same weight. The link 25, although shown in the form of a loop, may be of any desired form.

Having thus described the invention, what is claimed is:—

1. A tire protector embodying side chains; tie chains connecting the side chains at intervals and disposed substantially at right angles to the side chains; and crossed chains connecting the side chains between the tie chains, one of the crossed chains embodying twisted links, the other of the crossed chains including twisted links and a flat loop-shaped link connecting the said twisted links, the flat loop-shaped link passing through one of the twisted links of the first specified crossed chain.

2. A tire protector embodying circumferential side members; and crossed chains connecting the circumferential side members, one of the crossed chains embodying twisted links, and the other of the crossed chains including twisted links and a flat loop-shaped link connecting the said twisted links, the flat loop-shaped link passing through one of the twisted links of the first specified crossed chain.

3. A tire protector embodying side chains; tie chains connecting the side chains at intervals disposed substantially at right angles to the side chains; and crossed chains connecting the side chains between the tie chains, one of the crossed chains embodying twisted links and the other of the crossed chains including twisted links and an intermediate link, the intermediate link passing through one of the twisted links of the first specified crossed chain.

In testimony that I claim the foregoing as my own, I have hereto affixed my signature.

THOMAS MARVIN JARRELL.